3,428,518
FILAMENTARY REINFORCEMENT FOR LAMINATED ARTICLES AND RELATED METHODS
Kenneth A. Schafer, Cedarburg, Wis., assignor to Freeman Chemical Corporation, Port Washington, Wis., a corporation of Delaware
Filed Jan. 24, 1963, Ser. No. 253,545
U.S. Cl. 161—170        13 Claims
Int. Cl. C03c *25/02*

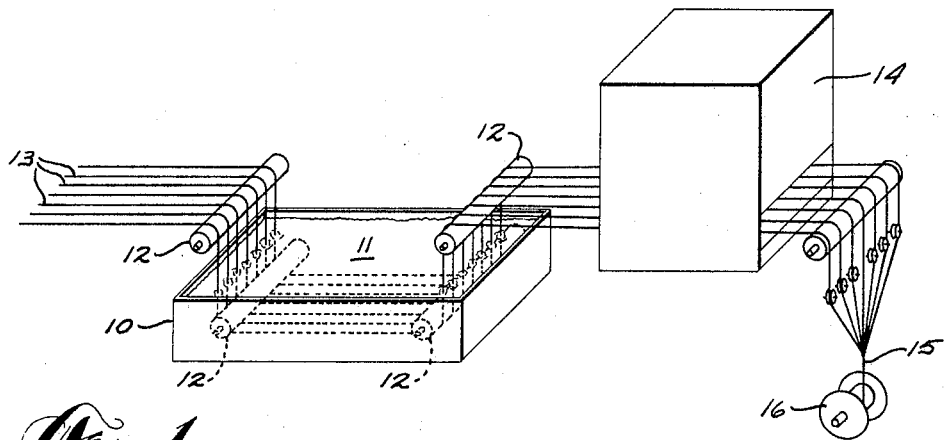
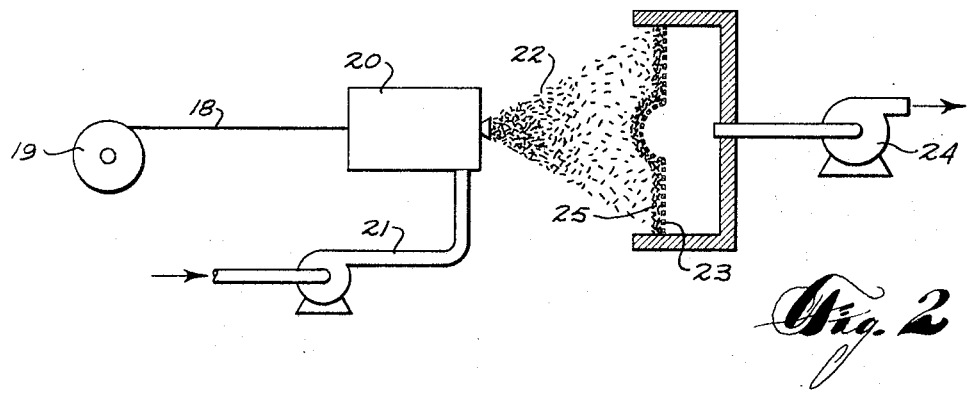
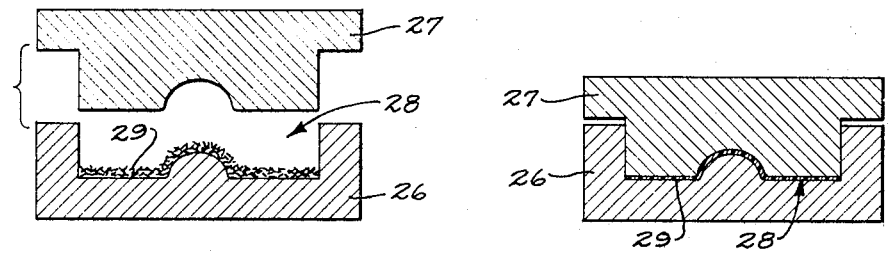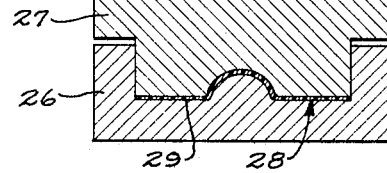
INVENTOR.
KENNETH A. SCHAFER
BY Harry B. Keck
ATTORNEY "# United States Patent Office 3,428,518
Patented Feb. 18, 1969

This invention relates to resin-coated fibers and to a method for making the same; to laminating preform mats made from such resin-coated fibers and to a method for making the same; and to a method for making laminated articles from such resin-coated fibers.

The invention has its utility in the general field of fiber-reinforced thermoset plastic laminated articles.

PRIOR ART

Laminated articles are manufactured from thermosetting resinous substances and fibrous reinforcing materials. The thermosetting resinous substances frequently comprise unsaturated polyester resin compositions which normally are liquid solutions of alpha-beta ethylenically unsaturated polyesters contained in a liquid copolymerizable monomer such as styrene. The fibrous reinforcing materials most commonly employed are glass fibers.

The glass fibers are commercially available in the form of roving which customarily comprises a grouping of about 60 strands of glass fibers. The individual strands of the roving customarily comprise 102 or 204 individual filaments of glass. The typical roving thus comprises 6,120 or 12,240 individual glass fibers.

To form laminating preform mats, a length of roving is introduced into a chopping machine which cuts the roving into relatively short lengths (2–3 inches is common) of individual fibers. The short lengths of individual fibers are directed as an airborne stream against a preform screen which has a configuration corresponding to the shape of the ultimate article which is to be laminated. Customarily a reduced pressure is maintained behind the screen in order that the glass fibers will be retained on the surface in a substantially uniform thickness.

While the fibers are thus retained on the preform screen, a suitable liquid adhesive is sprayed over the preform mat to retain the glass fibers in their randomly oriented relation. Customary adhesives are water emulsion of polyesters, polystyrene, urea-formaldehyde, starch, acrylic adhesives, and the like. After the adhesive has dried (usually heat is applied), the preform mat is removed from the preform screen and stored for later use in laminating molds. The preform is subjected to tearing and distortion in the storage and handling between the instant it leaves the preform screen and the moment when it is positioned in a laminating mold.

In compression molding, the preform mat is introduced into a laminating mold which has a shape corresponding to that of the desired laminated article. A liquid thermosetting resinous composition, usually a styrene solution of unsaturated polyesters is introduced into the mold cavity. The mold is closed and, under pressure, the resin surrounds the glass fibers of the preform mat and fills the interstices of the mat. Upon application of curing heat to the mold, the liquid resinous composition is cured while the preform mat is disposed under compression within the mold cavity. After the cure has been effected, the mold cavity is opened and a laminated article is removed which contains cured thermoset resinous materials having fibrous reinforcing materials randomly dispersed throughout its body.

In transfer molding, the preform mat is placed in a mold cavity which is then closed. Fluid resin is forced into the closed mold cavity under pressure and cured.

Where preform mats are not employed, it is feasible to introduce reinforcing fibers and liquid thermosetting resins directly into a mold cavity and allow the fibers to become randomly oriented as the mold cavity is closed. The technique is applied in both compression molding and transfer molding.

Glass reinforcing fibers frequently are coated with various reagents for promoting the wetting of their surfaces with the liquid thermosetting resinous solutions, and to improve the bond between the resin and the fibers.

THE PRESENT INVENTION

According to the present invention, individual glass fibers are coated with a dry, thermosetting resinous composition which can be cured directly without the use of additional liquid copolymerizable monomers. The thermosetting resinous composition, moreover, can be partially fused without curing in order to serve as a binder for retaining the individual fibers of the laminating preform in their random orientation.

Preferably the dry thermosetting resinous composition which is applied to the individual fibers as a coating comprises a mixture of the following materials:

(*a*) an unsaturated polyester resin having alpha-beta ethylenic unsaturation; and
(*b*) a diester-polyether having two terminal >C=CH$_2$ groups and having the structural formula

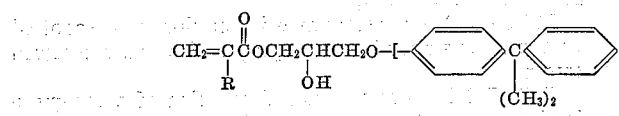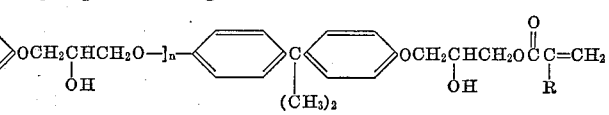

wherein R is selected from the class consisting of hydrogen, lower aliphatic hydrocarbon radicals and phenyl radicals; and *n* is an integer from zero to twelve. These materials can be fabricated by reacting acrylic acid, methacrylic acid or cinnamic acid with an epoxy resin having the formula

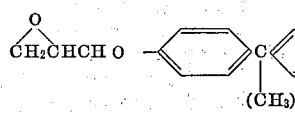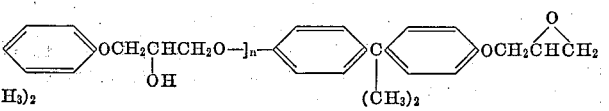

Alternatively the materials may be fabricated by reacting glycidyl acrylate, glycidyl methacrylate or glycidyl cinnamate with bisphenol-A (where *n* is zero).

Alternatively the diester-polyether (*b*) may be utilized alone, without the unsaturated polyester resin as the coating composition.

The unsaturated polyesters are fabricated by reaction of glycols such as ethylene glycol, propylene glycol, and the like with dicarboxylic acids, at least a portion of which comprise alpha-beta-ethylenically unsaturated dicarboxylic acids or anhydrides such as maleic acid, fumaric acid, maleic anhydride, and the like. The usual unsaturated polyester is a solid substance or an extremely viscous syrup at room temperature.

The diester polyethers are usually solid substances at room temperature, although where the value of *n* in the"

structural formula is zero, the materials may be a viscous syrup.

A mixture of the described diester polyether and the unsaturated polyester will copolymerize to yield a thermoset resinous substance. The use of polymerization initiators such as benzoyl peroxide, dicumyl peroxide and similar peroxy compounds will accelerate the thermoset curing of the mixtures. The described diester-polyether will homopolymerize with itself.

The specific unsaturated polyester and the specific diester polyether are selected to provide a mixture which is a dry solid substance at ambient room temperatures. Where a syrupy unsaturated polyester is selected, the diester diether should be a solid substance. Where both the unsaturated polyester and the diester diether are solids, there is no difficulty. Where the diester polyether is syrupy, the unsaturated polyester should be a solid substance. Suitable fillers may be included with the resins to increase the dryness of the resinous composition. Polyvinyl formal may be added to increase dryness of the resinous composition.

To apply the present polymerizable composition to the fibers, the materials are dissolved in a suitable inert solvent such as acetone, methyl-ethyl-ketone, xylene, benzene and the like. The quantity of solvent is determined by the thickness of coating which is desired on the fibers. In general, as the viscosity of the solvent solution of the resinous composition increases, the thickness of the resin coating will increase. The bath is maintained at a temperature well below that at which polymerization occurs. Room temperature baths are suitable.

The individual fibers or strands of fibers are passed through the solvent bath containing the resin mixture and are separately withdrawn with a coating of the resinous mixture solution thereon. The solvent is flashed from the coated fibers or strands leaving behind dry-coated fibers. The dry-coated fibers may be utilized as such, but preferably they are combined into a strand or roving containing individual coated fibers or strands. The roving or strands thus contain fibers which are individually coated with a dry, thermosetting resinous composition. They may be chopped into short lengths in accordance with the prior art of fabricating laminating preform mats. However, the present preform mats do not require extrinsic adhesive sprays for setting. While it is permissable to utilize a suitable adhesive spray to set the preform mat, it is preferred to heat the preform mat slightly while it is yet retained on the preform screen to cause slight fusion of the thermostat resinous coating of the fibers. The fusion will occur at points of fiber-to-fiber contact. Cooling of the fused coating will restore hardness and dryness so that the resulting preform mat may be removed from the preform screen and handled with significantly less tearing and damage in storage and movement. The slight heating of the preform mats should be carefully regulated to avoid initiation of copolymerization. Temperatures of about 100–250° F. should suffice.

The resulting laminating preform mats may be introduced into a laminating molding cavity and compressed therein. No additional liquid copolymerizable monomers are required to effect a complete cure of the present preform mats, since they will contain the precise quantity of thermosetting laminating resins for completing the desired laminates. Of course, if additional liquid copolymerizable monomers are desired in the molding cavity, they may be added without departing from the spirit of the invention. However, in the preferred embodiment of the laminating molding process, no additional monomers are employed. The entire laminating process is dry.

After the molding cavity has been closed and the present preform mat has been compressed therein, application of heat will cause the resinous coating to fuse and fill the interstices of the fibrous preform mat. Thereafter the thermosetting polymerization reactions proceed to completion. Typical curing temperatures are in the range of 100–375° F.

The thickness of the resin coating on the fibers should be such that the resulting coated fibers contain from 20 to 80 percent fiber by weight. The structural properties desired in the resulting laminated article will in large measure determine the proper ratio of fiber to resin and hence the thickness of the resin coating.

The resin bath desirably will contain both an inhibitor of polymerization (such as quinone, hydroquinone, toluhydroquinone, tertiary butyl catechol, and the like) in an amount from 0.1 to 2.0 percent by weight of the resin. The resin bath further may contain a suitable polymerization initiator (such as cumene hydroperoxide, benzoyl peroxide and the like) in an amount from about 0.1 to 2.0 percent of the weight of resin.

The objects of the present invention include:

To provide fibers coated with a dry, thermosetting resinous composition;

To provide a method for making fibers with a dry, thermosetting resinous composition;

To provide laminating preform mats from fibers having a coating of dry, thermosetting resinous substances;

To provide laminating preform mats wherein the fibers are retained in their random orientation through fusion of a thermosetting resinous coating substance covering each individual fiber;

To provide a method for preparing preform mats from fibers coated with a dry, thermosetting resinous substance wherein the coating serves to retain the random orientation of the fibers through fusion with itself at points of fiber-to-fiber contact within the preform mat;

To provide a method for making laminated articles from fibers which are coated with a dry, thermosetting resinous composition without the need for additional liquid copolymerizable monomers.

These and other objects and advantages of the present invention will become apparent from the following detailed description by reference to the accompanying drawings in which:

FIGURE 1 is a perspective illustration of a fiber coating bath, drier and spool;

FIGURE 2 is a perspective illustration of a spool of coated fibrous strands, a chopping device and a preform screen;

FIGURE 3 is cross section illustration of a two-piece laminating mold in an open position with a laminating preform positioned within the molding cavity; and FIGURE 4 is a cross sectional illustration of the laminating mold of FIGURE 3 in the closed position with the laminating preform mat compressed.

Referring to FIGURE 1 there is illustrated in schematic perspective a resin coating bath which consists of a tank 10 filled with a solvent bath 11 containing thermosetting resinous composition. The resinous composition includes the described diester-polyethers and preferably includes also an unsaturated polyester having alpha-beta-ethylenic unsaturation. The tank 10 has suitably located rollers 12 which direct fibers 13 into the solvent bath 11 and out of the solvent bath 11. The individual fibers 13 are preferably individually coated and withdrawn from the solvent bath 11 through a solvent removal zone 14 wherein the solvent is flashed from the coated fibers. Dry coated fibers emanate from the solvent removal zone 14 and are collected into strands 15 for spooling on a suitable spool 16. Instead of coating individual fibers, groups or strands of fibers may be coated as an entity and collected into larger strands for spooling.

The strands 15 thus contain a plurality of individual discrete fibers, each of which has a dry coating of the present resinous composition. The strands may be combined further into roving as is a customary practice in the reinforcing fiber art.

The present roving may be utilized for any of the purposes to which reinforcing fibers are applied in the reinforced plastic arts, i.e., in winding tapes, in preform mats, as fibrous reinforcing substances and the like.

Preferably, as indicated schematically in FIGURE 2, strand or strands 18 are unwound from a spool 19 and passed into a chopping device 20. A stream of air is introduced into the chopping device 20 through a conduit 21 to provide a carrying stream 22 for chopped fiber lengths which may be directed against a foraminous preform surface or screen 23 having a configuration corresponding to the desired laminated article. The preform screen 23 preferably has mounted behind it an exhaust fan 24 to draw air continuously through the screen in order to maintain the short length of fibers in a random orientation on the exposed surface.

The chopped fiber lengths from the stream 22 form a preform mat 25 on the exposed surface of the preform screen 23. After the preform mat 25 has achieved the desired thickness, the stream 22 is interrupted and the preform mat is set, i.e., the individual fiber lengths are retained in the random orientation which they have assumed. This may be accomplished as in the past through the use of a spray of water-soluble adhesive, or, according to a preferred embodiment of this invention, by heating the preform mat 25 to a temperature which will fuse the resinous coating of the fibers, yet not initiate thermoset curing of the coating resins. A temperature of 100 to 250° F. should suffice. Conveniently the heating may be accomplished by passing steam of heated air through the preform mat 25 and the preform screen 23 for a brief period. A momentary blast of hot air or steam at 500° F., for example, might be sufficient to cause the limited fusion which is desired without initiating the thermoset polymerization reactions.

The resulting fibrous-fused preform mat 25 then is withdrawn from the preform screen 23 and stored or transported to a laminating mold apparatus. Such molding devices are schematically illustrated in FIGURES 4 and 5 wherein a base mold element 26 and an upper mold element 27 are provided. The two elements 26, 27 can be mated to provide a mold cavity 28 therebetween. A preform mat 29 is deposited on the base mold element 26 within the mold cavity 28, as seen in FIGURE 3. Thereafter the upper mold element 27 is mated with the base mold element 26 to compress the preform mat 29 into the precise mold cavity 28. The mold elements 26, 27 are heated to cause curing of the thermosetting resinous materials which comprise the coating of the individual fibers of the preform mat 29. The resulting laminated article is withdrawn from the mold cavity after the mold elements 26, 27 are separated.

A specific example of the present invention will now be described.

The coacting resin mixture contains:

One part by weight of the reaction product of glycidyl methacrylate and Bisphenol A and three parts by weight of propylene meleate, the unsaturated polyester which is obtained by reacting propylene glycol with maleic anhydride. The diester polyether had the formula

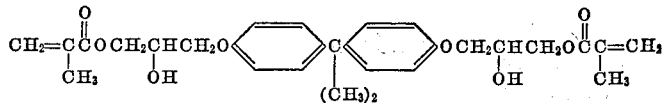

The resulting mixture is a solid substance at room temperature. The mixture is soluble in acetone.

Coating solution containing from 10 to 30 percent acetone by weight and the balance the 3:1 resin mixture were prepared. The solution also contained a small quantity (1 percent by weight of the resin) of toluhydroquinone as inhibitor and a small quantity (1 percent by weight of the resin) by benzoyl peroxide as polymerization initiator.

Glass fibers are passed through the resin bath and coated with the resin. The actone solvent is fllashed from the coated fibers and the dry fibers are collected for use. The ratio of weight of coating to weight of glass fibers was readily varied according to the quantity of acetone in the solvent bath. It was also possible to utilize inert filler substances to regulate the viscosity of the bath and hence the amount of resin which adhered to the fibers as a coating.

Short lengths of the fibers were formed into a preform mat which contained fifty percent by weight glass fibers and fifty percent by weight of the described dry resin coating.

The preform was compressed between two molding elements which were heated. The cured laminated article possessed excellent properties.

Because of the use of the present diester polyether in the resin formulation, the laminated article possessed remarkable heat distortion properties and high temperature strength retention. During the cure of the present preform mats, the initial application of heat within the molding apparatus causes fusion of the resin which allows the material to flow into the interstices of the compressed fibrous preform mat.

GENERAL

The unsaturated polyesters which are incorporated into the present resin formulation are the reaction products of a glycol and an alpha-beta ethylenically unsaturated dicarboxylic acid or anhydride. Suitable glycol include: ethylene glycol, propylene glycol, diethylene glycol, dipropylene glycol, butylene glycol, octylene glycol, xylylene glycol, and the like. Suitable unsaturated dicarboxylic acids include maleic, fumaric, itaconic, citraconic, endomethylene tetrahydrophthalic, inter alia. In the formulation of the unsaturated polyester resins, some saturated dicarboxylic acids and anhydride may be utilized for desired properties of the final product. Suitable saturated dicarboxylic acids which may be used include phthalic, isophthalic, terephthalic, and the like.

While the use of glass fibers is preferred because of their strength and convenience, other fibrous materials may be utilized in this invention, e.g., synthetic plastic fibers, natural fibers such as cotton, and the like. The resin mixture bath may have suitable fillers incorporated so that the resulting coated fibers will possess the desired properties which derive from the selected fillers.

In a further embodiment of the invention, the individual fibers or strands of fibers may be preliminarily coated with a thermoset resinous composition prior to application of the coating of this invention. For example, glass fibers or bundles of glass fibers may be coated with a conventional unsaturated polyester resin solution which is thereafter cured to a thermoset condition, thereby stiffening the relatively flexible fibers. By selecting the unsaturated polyester resinous composition of the desired hardness, the flexibility of the coated fibers may be regulated. The coated fibers with the thermoset resinous composition thereafter are coated according to this invention with dry, thermosetting resinous composition. A real advantage of utilizing such precoated fibers is that it permits the use of relatively inexpensive resins for controlling the stiffness of the fibers and minimizes the quantity of more costly resins which are utilized to complete the eventual laminated article.

The precoated fibers are also of especial interest in eliminating inherent weaknesses of the so-called "weld lines" which exist where multiple charges of fibrous material are introduced into a molding cavity. Customarily where multiple charges are employed, the relatively soft and flexible fibers do not become intermeshed where the two charges adjoin through compression—instead the flexible fibers have a tendency to bend so that there is little, if any, intermeshing of the fibers between the adjoining charges. As a result there has been observed inherent weakness along the so-called "weld line" between the adjoining charges. The stiffened, coated fibers of this invention promote intermeshing of the fibers and elimination of the so-called "weld lines."

Where resinous mixtures are employed, the precise ratio of the unsaturated polyester resin to the diester polyether is determined according to the chain length of each ingredient, according to the need for dryness in the solvent free mixture and according to the desired properties of the resulting laminated article. The diester polyether may comprise from about 10 to 100 percent of the resinous composition, preferably from about 20 to 50 percent.

Other specific diester polyethers which may be combined into the resinous mixtures include:

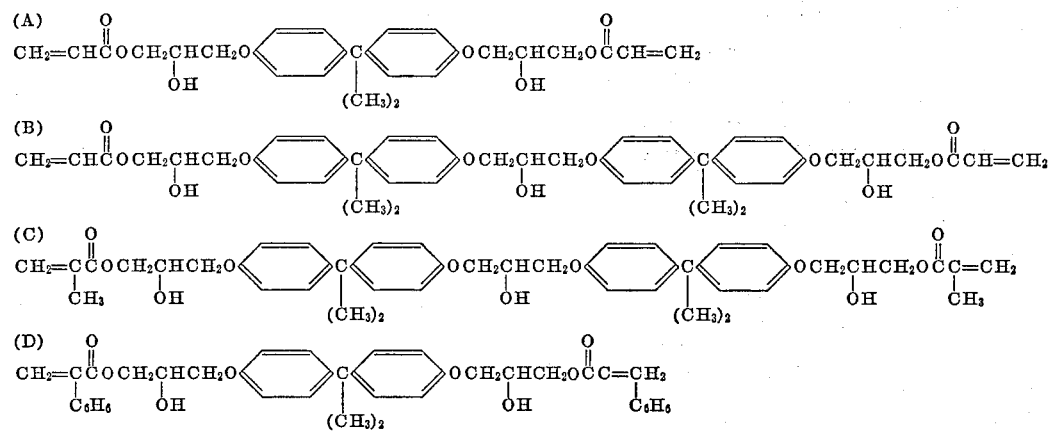

(A) and (D) may be prepared by reacting an epoxy resin ($n=0$)

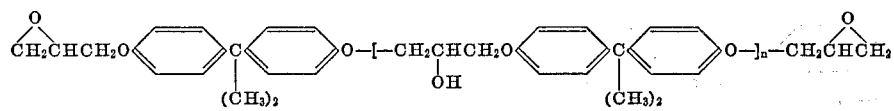

with acrylic acid (A) and with cinnamic acid (D). (B) and (C) may be prepared by reacting the epoxy resin ($n=1$) with acrylic acid (B) and with methacrylic acid (C).

I claim:
1. Fibrous roving comprising discrete fibers each coated with a dry, thermosetting resinous mixture comprising:
   (a) an unsaturated polyester resin having alpha-beta ethylenic unsaturation; and
   (b) a polymerizable diester polyether resin having the formula

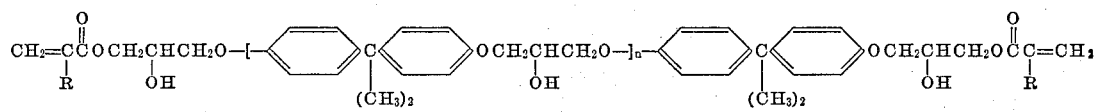

wherein R is selected from the class consisting of hydrogen, lower aliphatic hydrocarbon radicals and phenyl radicals; and $n$ is an integer from zero to twelve.

2. The method of preparing a dry, resin-coated fibrous material which comprises:
   passing individual fibers through a resinous bath containing a solvent and a normally solid thermosetting polymerizable resinous mixture comprising:
   (a) an unsaturated polyester resin having alpha-beta ethylenic unsaturation; and
   (b) a polymerizable resin having the formula

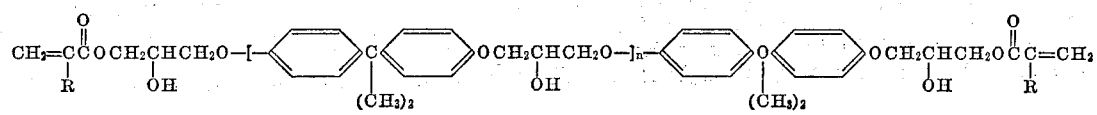

wherein R is selected from the class consisting of hydrogen, lower aliphatic hydrocarbon radicals and phenyl radicals; and *n* is an integer from zero to twelve;

whereby said fibers become individually coated with the resinous mixture and solvent, evaporating the solvent from the coated fibers to produce substantially dry fibers and individually coated with the said resinous mixture, and recovering the dry, coated fibers into a strand of discrete fibers.

3. A fibrous reinforcing mat preform for use in forming laminated articles comprising:
lengths of fibers randomly oriented in a preform mat, each filament being individually coated with a dry, thermosetting resinous mixture comprising:
(a) an unsaturated polyester resin having alpha-beta ethylenic unsaturation; and
(b) a polymerizable resin having the formula

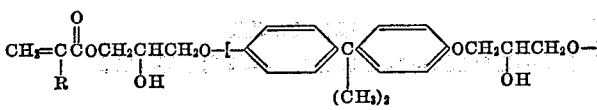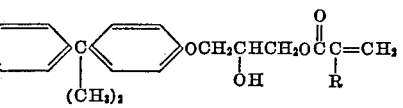

wherein R is selected from the class consisting of hydrogen, lower aliphatic hydrocarbon radicals and phenyl radicals; and
*n* is an integer from zero to twelve.

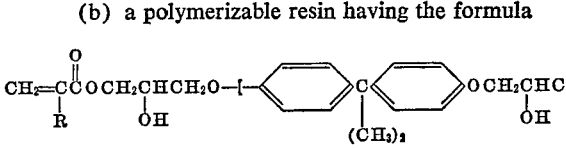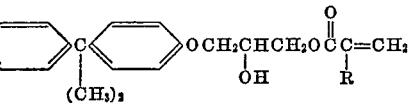

4. The fibrous reinforcing mat of claim 3 wherein the individual fibers are secured in a random orientation by means of fusion of the said dry resin coating at points of contact between individual ones of the said fibers.

5. The method of preparing a glass reinforcing preform mat for use in forming laminated articles which comprises:
chopping continuous strands of coated glass fibers into short lengths, the said glass fibers being individually coated with a dry, thermosetting resinous mixture comprising:
(a) an unsaturated polyester resin having alpha-beta ethylenic unsaturation; and
(b) a polymerizable resin having the formula

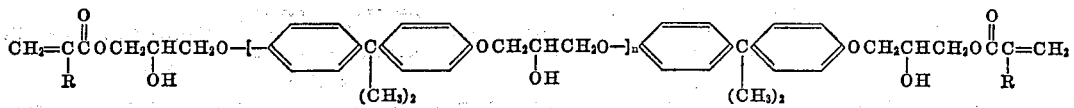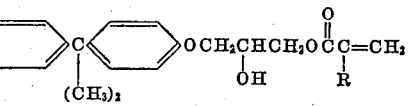

wherein R is selected from the class consisting of hydrogen, lower aliphatic hydrocarbon radicals; and *n* is an integer from zero to twelve;
depositing the said lengths of coated glass fibers on a foraminous preform surface in a random orientation to form a glass fiber preform mat conforming to the shape of the said preform surface, and heating the said preform mat while in contact with the said preform surface to fuse the said coating in those areas where the said fibers are in contact with one another, without curing the said coating to a thermoset condition, and recovering from the said preform surface a preform mat containing randomly oriented lengths of resin-coated glass fibers secured with respect to one another through fusion of the said coating at points of fiber-to-fiber contact.

6. The method of making a laminated fibrous reinforced plastic article which comprises introducing into a laminating mold a randomly oriented fibrous reinforcing mat comprised of glass fibers coated with a dry, thermosetting resinous mixture comprising:
(a) an unsaturated polyester resin having alpha-beta ethylenic unsaturation; and
(b) a polymerizable resin having the formula

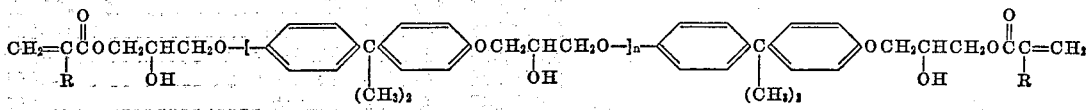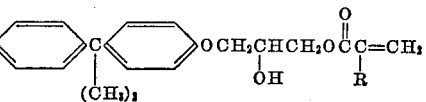

wherein R is selected from the class consisting of hydrogen, lower aliphatic hydrocarbon radicals and phenyl radicals; and *n* is an integer from zero to twelve;
compressing the said mat in the absence of additional liquid monomers and heating the said dry mat to a curing temperature for thermosetting of the said resinous coating, and recovering from the said laminating mold a laminated article.

7. Fibrous roving comprising discrete filaments each coated with a dry, thermosetting resinous normally solid composition comprising a polymerizable resin having the following formula:

wherein R is selected from the class consisting of hydrogen, lower aliphatic hydrocarbon radicals and phenyl radicals; and *n* is an integer from zero to twelve.

8. Coated fibrous roving comprising discrete fibers each coated with a dry, normally solid copolymerizable mixture comprising at least two thermosetting resinous ingredients each having alpha-beta-ethylenic unsaturation, the said fibers comprising from 20 to 80 percent by weight of the coated roving.

9. A fibrous reinforcing preform mat for use in forming laminated articles comprising:
lengths of coated fibers randomly oriented in the preform mat, each fiber being individually coated with a dry, normally solid copolymerizable mixture comprising at least two thermosetting resinous ingredients each having alpha-beta-ethylenic unsaturation, the said fibers comprising from 20 to 80 percent by weight of the coated fibers,
wherein the individual fibers are secured in a random orientation by means of a fusion of the said copolymerizable mixture at points of fiber-to-fiber contact.

10. The method of preparing a dry, resin-coated fibrous material which comprises:
passing individual fibers through a resinous bath containing a solvent and a copolymerizable mixture of at least two normally solid thermosetting resinous substances, each possessing alpha-beta-ethylenic unsaturation, whereby said fibers become individually coated with the copolymerizable mixture and solvent;

evaporating the solvent from the coated fibers to produce substantially dry fibers individually coated with the said copolymerizable mixture, and recovering the dry, coated fibers into a strand of discrete fibers, wherein the said fibers comprise from 20 to 80 percent of the weight of the strand.

11. The method of making a laminated fibrous reinforced plastic article which comprises introducing into a laminating mold a randomly oriented fibrous reinforcing preform mat comprised of glass fibers coated with a dry, thermosetting resinous mixture comprising at least two normally solid ingredients each having alpha-beta ethylenic unsaturation:

compressing the said preform mat in the absence of additional liquid monomers and heating the said dry preform mat to a curing temperature for the thermosetting of the said resinous coating, and recovering from the said laminating mold a laminated article.

12. The method of preparing a fibrous reinforcing preform mat for use in forming laminated articles which comprises:

chopping continuous strands of coated fibers into short lengths, the said fibers being individually coated with a dry, thermosetting resinous mixture comprising at least two normally solid copolymerizable ingredients each having alpha-beta ethylenic unsaturation, depositing the said lengths of coated fibers on a foraminous preform surface in a random orientation to form a fibrous preform mat conforming to the shape of the said preform surface and heating the said preform mat while in contact with the said preform surface to fuse the said coating in those areas where the said fibers are in contact with one another, without curing the said coating to a thermoset condition.

13. The method of preparing a fibrous reinforced plastic article which comprises introducing into a laminating mold randomly oriented fibers coated with a dry, thermosetting resinous composition comprising a polymerizable resin having the following formula:

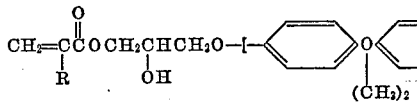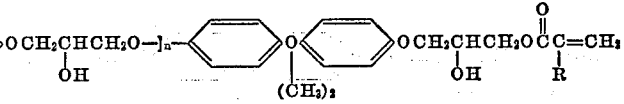

wherein R is selected from the class consisting of hydrogen, lower aliphatic hydrocarbon radicals and phenyl radicals; and $n$ is an integer from zero to twelve, the said article consisting essentially of the said fibers and the said resinous composition.

References Cited

UNITED STATES PATENTS

| | | | |
|---|---|---|---|
| 2,702,261 | 2/1955 | Bacon et al. | 161—168 |
| 2,860,687 | 11/1958 | Cole | 156—377 X |
| 3,177,275 | 4/1965 | Brenner | 264—128 |
| 3,240,658 | 3/1966 | Tucker et al. | 161—170 |
| 3,256,226 | 6/1966 | Fekete et al. | 260—861 |
| 3,030,247 | 4/1962 | Schurb | 161 |
| 3,276,945 | 10/1966 | Frickert | 161—175 |

EARL M. BERGERT, *Primary Examiner.*

T. R. SAVOIE, *Assistant Examiner.*

U.S. Cl. X.R.

117—126; 264—123, 152; 156—62.2; 260—872

UNITED STATES PATENT OFFICE
CERTIFICATE OF CORRECTION

Patent No. 3,428,518                    February 18, 1969

Kenneth A. Schafer

It is certified that error appears in the above identified patent and that said Letters Patent are hereby corrected as shown below:

Columns 1 and 2, lines 50 to 55, the formula should appear as shown below:

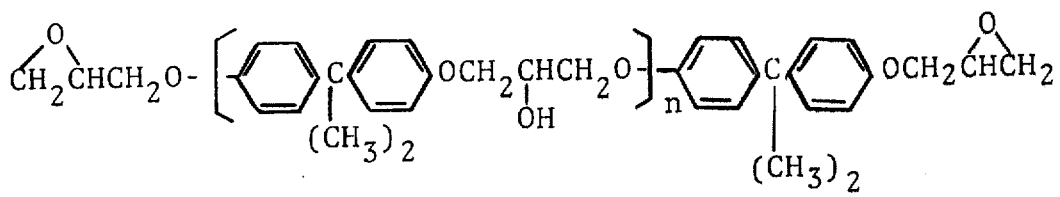

Column 3, line 49, "thermostat" should read -- thermoset --. Column 5, line 2, before "fibrous" insert -- bulk --; line 55, "meleate" should read -- maleate --; line 70, "by" should read -- of --. Column 6, line 26, "glycol" should read -- glycols --; line 33, "anhydride" should read -- anhydrides --. Columns 7 and 8, formula (D) should appear as shown below:

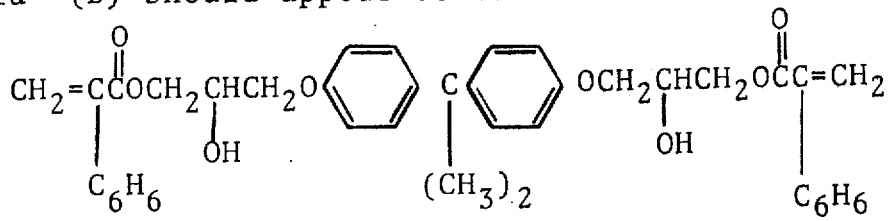

Signed and sealed this 24th day of March 1970.

(SEAL)
Attest:

EDWARD M. FLETCHER, JR.
Attesting Officer

WILLIAM E. SCHUYLER, JR.
Commissioner of Patents